United States Patent
Williams et al.

(10) Patent No.: US 6,598,150 B2
(45) Date of Patent: Jul. 22, 2003

(54) ASYNCHRONOUSLY ACCESSING THE PROGRAM COUNTER VALUES OF A DATA PROCESSING SYSTEM BY APPLYING AN INDEPENDENT CLOCK ON THE LATCHING AND SCAN-CHAIN CIRCUITS

(75) Inventors: Michael John Williams, Cambridge (GB); Andrew John Merritt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/969,158

(22) Filed: Oct. 3, 2001

(65) Prior Publication Data

US 2002/0049893 A1 Apr. 25, 2002

Related U.S. Application Data

(63) Continuation of application No. 09/258,127, filed on Feb. 26, 1999, now abandoned.

(51) Int. Cl.$^7$ .................................................. H03L 7/00
(52) U.S. Cl. ........................ 712/227; 714/731; 714/729
(58) Field of Search ............................. 716/27, 28, 30, 716/5, 1, 726, 724, 731, 729, 100; 364/104.1; 706/911, 902; 712/220, 227

(56) References Cited

U.S. PATENT DOCUMENTS

| 5,157,781 | A | * | 10/1992 | Harwood et al. ............. 714/30 |
| 5,515,382 | A | * | 5/1996 | Lassorie ..................... 714/724 |
| 5,642,479 | A | * | 6/1997 | Flynn ......................... 714/45 |
| 5,841,670 | A | * | 11/1998 | Swoboda ..................... 703/23 |
| 5,884,023 | A | * | 3/1999 | Swoboda et al. ............. 714/30 |
| 5,900,753 | A | * | 5/1999 | Cote et al. .................. 327/145 |
| 5,996,092 | A | * | 11/1999 | Augsburg et al. ............. 714/38 |

* cited by examiner

Primary Examiner—Zarni Maung
Assistant Examiner—Wen-Tai Lin
(74) Attorney, Agent, or Firm—Nixon & Vanderhye P.C.

(57) ABSTRACT

A processing system 2 is described including a processor unit 4 and a memory 6. Diagnostic hardware 10 within the processing system 2 includes a shadow PC register 12 that stores a shadow program counter value following the true program counter value held within a program counter register 8 of the processor unit 4. The diagnostic hardware 10 is responsive to a program counter request signal from an external diagnostic system 14 to transfer a program counter value into a scan chain 16 from where it can be returned to the diagnostic system 14. The operation of the processor unit 4 is independent of any of the diagnostic operations and so true real time operation of the system may be observed and de-bugged.

12 Claims, 2 Drawing Sheets

ASYNCHRONOUSLY ACCESSING THE PROGRAM COUNTER VALUES OF A DATA PROCESSING SYSTEM BY APPLYING AN INDEPENDENT CLOCK ON THE LATCHING AND SCAN-CHAIN CIRCUITS

This application is a continuation of application Ser. No. 09/258,127, filed Feb. 26, 1999, abandoned, the entire content of which is here by incorporated by reference in this application.

BACKGROUND OF THE INVENTION

1. Field of the Invention

This invention relates to data processing systems. More particularly, this invention relates to data processing systems having a program counter register storing a program counter value pointing to an instruction being executed and having a mechanism for accessing that program counter value for diagnostic purposes.

2. Description of the Prior Art

When performing diagnostic operations, such as de-bugging, on a data processing system executing program instructions, it is often useful to know which instructions within the overall software code are being executed. One way of achieving this is to use data capturing hardware on the relevant buses within the data processing system to generate a trace output of every single instruction that is executed as a stream of real time data. A problem with this approach is that high speed and expensive memories are needed to store the very large quantities of data generated and the storage capacity of such memory means that only small intervals of time can be monitored completely.

Another approach is to perform code profiling in which the program counter value is sampled at known times and a statistical picture of the contents of the program counter register is gradually developed. One way of achieving such sampling is to apply an interrupt signal to the processing system to cause interrupt code to execute that outputs the value of the program counter register at the point that the interrupt occurred. A problem with this approach is that the interrupt necessarily disturbs the true behavior of the real time operation of the system and so in some circumstances can produce unrealistic results.

An alternative approach is software emulation of the processing system. Whilst such software emulation allows real time operation to be simulated in non-real time, it does have the problem that one can never be certain that a software emulation will truly represent the real behavior of the physical system. Software emulation is also disadvantageously slow.

SUMMARY OF THE INVENTION

Viewed from one aspect the present invention provides an apparatus for processing data, said apparatus comprising:

(i) a processor unit for executing data processing instructions;

(ii) a program counter register within said processor unit for storing an instruction address of a data processing instruction being executed by said processor unit;

(iii) a scan chain for serially transferring diagnostic data between said processor unit and a diagnostic system; and (iv) a program counter latching circuit responsive to a program counter value request signal from said diagnostic system for latching an instruction address from said program counter register, transferring said instruction address to said scan chain and serially transferring said instruction address from said scan chain to said diagnostic system;

(v) wherein said scan chain and said program counter latching circuit operate independently of said processor unit such that execution of data processing instructions by said processor unit is unaltered by said action of said scan chain and said program counter latching logic.

The present invention recognizes that many modem data processing systems already incorporate scan chains that are used for other diagnostic purposes. These scan chains can be reused for accessing program counter values. Furthermore, rather than the data processing system itself continuously driving the high speed output of a large volume of program counter value data, the invention turns this arrangement around with the diagnostic system requesting the program counter values from the data processing system being analyzed. This arrangement greatly simplifies the handling of the diagnostic data making the program counter value information available at an advantageously reduced cost and complexity.

Whilst the program counter request signal could be an individually provided signal into the data processing system on a dedicated input, it is preferred that this should take the form of a diagnostic instruction serially transferred into the data processing system under test. In this way existing mechanisms for transferring diagnostic instructions can be added to so as to provide the function of the program counter request signal without incurring the cost of a dedicated signal pin or separate dedicated handling mechanisms.

It will be appreciated that the processor unit will typically be driven at a processor clock speed by a processor clock signal. In order to perform accurate diagnosis of real time operation, it is important that the processor unit should continue to be driven by this signal when the diagnostic operations are being performed. The diagnostic mechanisms within the system may often be unable to operate at the full processor clock speed and accordingly are driven by a separate scan chain clock signal that is independent of the processor clock signal. This prevents the diagnostic operations interfering with the processor unit, but does introduce a need for synchronization between the two clock signals such that a stable program counter value is sampled at an appropriate predetermined point within the processing clock cycle. Synchronizing hardware can be provided to achieve this.

A convenient way to embody the invention is to provide a program counter value shadowing register that continuously serves to store a shadow value of the program counter value current within the processor unit. This shadow value is continuously updated in synchronism with the real value and the shadow value is accessible for latching and output when instructed by the external diagnostic system.

In preferred embodiments the scan chains are part of a JTAG scan chain that may be controlled using readily available standard equipment and software.

The program counter latching circuit can conveniently be provided in combination with circuitry that monitors the address bus and data bus of the processor unit as these buses will bear signals that allow a program counter value to be determined and so be accessible for output to the diagnostic system. The program counter latching circuit may reuse logic that is already in place for other purposes, e.g. run control, coprocessor control, etc.

Whilst the invention could be used to recover program counter values for a variety of uses, it is particularly suited for use in code profiling where the true de-coupling of the processor unit operation and the diagnostic system ensures true operation of the processor unit and the statistical sampling of the program counter value provides a sufficient degree of information to draw useful code profiling conclusions.

The diagnostic system that issues the program counter request signals could be special purpose hardware produced for diagnostic purposes. However, the diagnostic system may conveniently be provided by a relatively low cost computer system operating under software control.

Whilst the invention is applicable for processing systems in general, it is particularly advantageous in the field of application specific integrated circuits where diagnostic information is highly useful in de-bugging the ASICs and yet access to the internal data, such as program counter values, can be difficult to achieve.

Viewed from another aspect the present invention provides a method of processing data, said method comprising the steps of:

(i) executing data processing instructions upon a processor unit;

(ii) storing in a program counter register within said processor unit an instruction address of a data processing instruction being executed by said processor unit;

(iii) in response to a program counter value request signal from a diagnostic system to a program counter latching circuit, latching an instruction address from said program counter register, transferring said instruction address to a scan chain and serially transferring said instruction address from said scan chain to said diagnostic system;

(iv) wherein said latching, said transferring and said serial transferring are performed independently of said processor unit such that execution of data processing instructions by said processor unit is unaltered by said latching, said transferring and said serial transferring.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
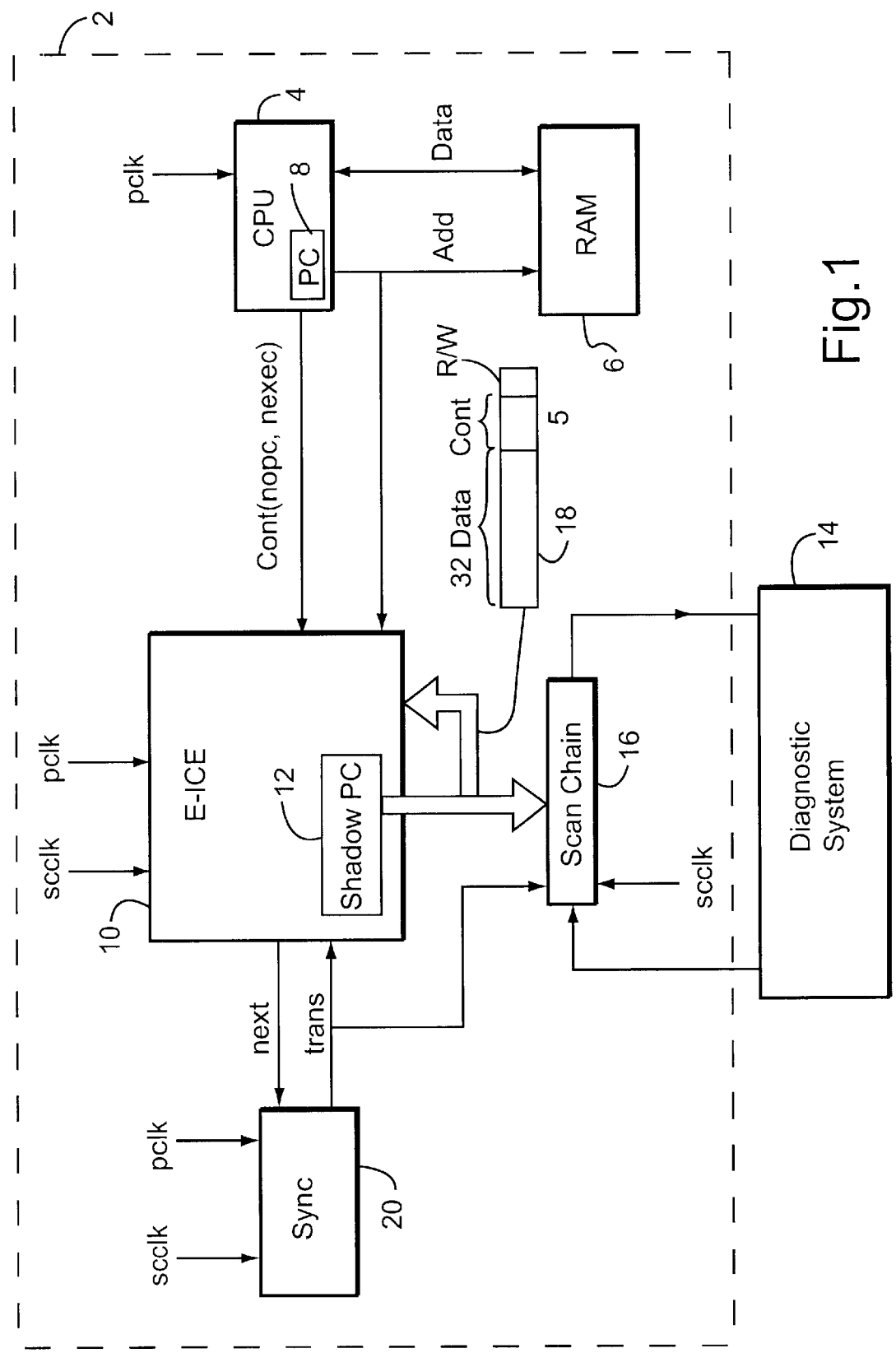
FIG. 1 illustrates an ASIC including embedded diagnostic hardware together with an attached diagnostic system.

FIG. 1 shows an application specific integrated circuit ASIC 2 including a processor unit 4 and a memory 6. The processor unit 4 and the memory 6 are linked by an address bus Add and a data bus Data. The processor unit 4 executes data processing instructions recovered from the memory 6. The data processing instruction being executed has its instruction address value within the memory 6 stored within a program counter register 8 within the processor unit 4. The processor unit 4 is driven by a processor clock signal pclk and operates in real time at its full normal operating speed.

Diagnostic hardware 10 is provided within the ASIC 2. This diagnostic hardware may be an in-circuit emulation unit such as the embedded in-circuit emulation units provided by ARM Limited of Cambridge, England. The diagnostic hardware receives many signals from the rest of the ASIC 2. The signals received that are shown in FIG. 1 are the address signal from the address bus Add and control signals Cont including a signal "nopc" indicating whether an address value corresponds to an instruction address value and a signal "hexec" indicating whether or not an instruction currently pointed to by the program counter register 8 is being executed. The diagnostic hardware 10 also receives the processor clock signal pclk and a scan chain clock signal scclk.

A shadow program counter register 12 is provided within the diagnostic hardware 10 and is responsive to the address signal from the address bus Add and the control signals Cont to maintain a shadow PC value that is the same as the PC value stored within the program counter register 8 within the processor unit 4. The value within the shadow program counter register 12 is continuously updated as the corresponding value within the program counter register 8 changes in synchronism with the processor clock pclk.

A diagnostic system 14 coupled to the ASIC 2 via a JTAG scan chain system serves to serially transfer data into and from a scan chain 16 associated with the diagnostic hardware 10. Diagnostic instructions 18 can be scanned into the scan chain 16 by the diagnostic system 14. These diagnostic instructions 18 are used to control the operation of the diagnostic hardware 10. The diagnostic instructions 18 can be in the form of a 38-bit word comprising a 32-bit data field, a 1-bit read or write field and a 5-bit control field. These diagnostic instructions will typically trigger and control predetermined operations within the diagnostic hardware 10.

One particularly diagnostic instruction is a program counter request instruction. This instruction will be serially clocked into the scan chain 16 under control of the scan chain clock signal scclk. From the scan chain 16, the instruction is read by the diagnostic hardware 10. The instruction is interpreted by the diagnostic hardware 10 as indicating that the program counter value stored within the shadow program counter register 12 should be transferred into the scan chain 16 in time for the value to be read out by the diagnostic system. In order to deal with the synchronization issue between the shadow program counter register 12 and the diagnostic hardware 10, a synchronization unit 20 is provided. The synchronization unit 20 receives a signal "next" from the diagnostic hardware 10 indicating that the transfer from the shadow program counter register 12 to the scan chain 16 should take place at the next available point within the processor clock signal pclk. When this predetermined point is reached within the processor clock signal pclk, the synchronization unit 20 issues a transfer signal "trans" to the diagnostic hardware 10 and the scan chain 16 that initiates the writing into the scan chain 16 of the current value held within the shadow program counter register 12.

Once this transfer has taken place, the captured program counter value can be serially clocked out from the scan chain 16 to the diagnostic system 14 using standard JTAG techniques.

Figure 2:
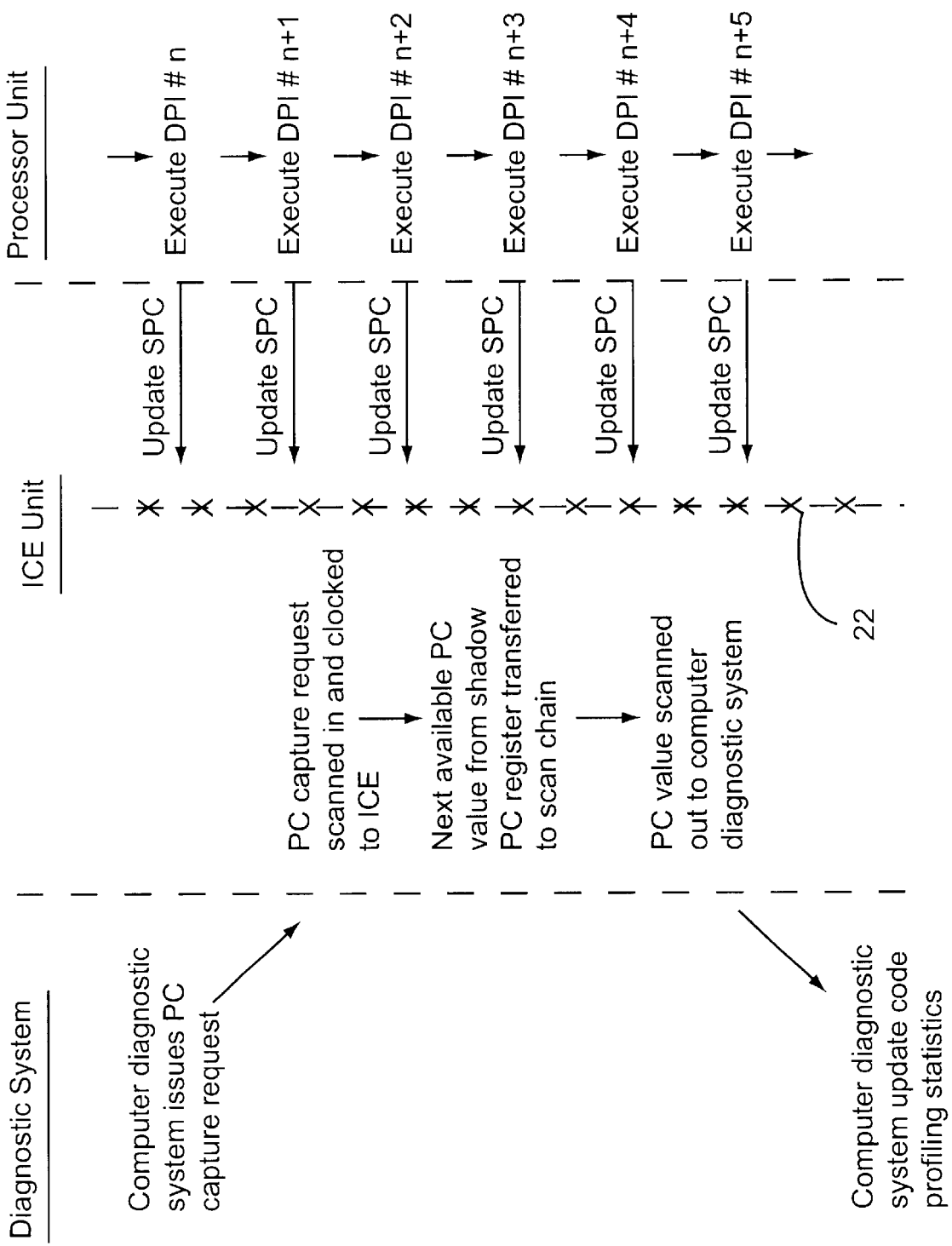
FIG. 2 is a diagram illustrating the operation of various portions of the system of FIG. 1.

FIG. 2 illustrates the operation of various portions of the system shown in FIG. 1. At the right hand side of FIG. 2, the operation of the processor unit 4 is illustrated whereby it executes its sequence of data processing instructions. This sequence of execution is unaffected by any of the diagnostic processes. The diagnostic hardware 10 serves to update the shadow program counter register 12 each time the program counter register 8 within the processor unit 4 changes. This updating is driven by the processor clock signal pclk and is achieved via the snooping of the address bus Add in combination with the control signals Cont.

When the diagnostic system 14 wishes to request a program counter value, it issues a program counter capture signal to the diagnostic hardware 10. This request signal is scanned in to the scan chain 16 and then transferred to the diagnostic hardware 10. The diagnostic hardware 10 interprets this request signal and issues an appropriate control signal "next" to the synchronizing unit 12 that in turn serves to trigger the transfer of the shadow program counter value to the scan chain 16 at the next appropriate point within the processing clock signal pclk. When this transfer has taken place, the captured PC value is scanned out of the scan chain 16 and returned to the computer diagnostic system 14 for processing, such as by code profiling.

It will be appreciated that the operation of the processing unit 4 is de-coupled from the diagnostic system by the action of the shadow program counter register 12 in combination with the other elements of the diagnostic system. This de-coupling allows real time fully representative operation of the processing unit 4 to be performed whilst program counter values may be recovered upon request by the diagnostic system.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    (i) a processor unit for executing data processing instructions;
    (ii) a program counter register within said processor unit for storing an instruction address of a data processing instruction being executed by said processor unit;
    (iii) a scan chain for serially transferring diagnostic data between said processor unit and a diagnostic system;
    (iv) a program counter latching circuit, responsive to a program counter value request signal from said diagnostic system, for latching an instruction address from said program counter register, and transferring said instruction address to said scan chain; and
    (v) wherein said scan chain and said program counter latching circuit operate independently of said processor unit such that execution of data processing instructions by said processor unit is unaltered by action of said scan chain and said program counter latching logic.

2. Apparatus as claimed in claim 1, wherein said program counter value request signal is a diagnostic instruction serially transferred into said apparatus to control said program counter latching circuit and said scan chain.

3. Apparatus as claimed in claim 1, wherein said processor unit is driven by a processor clock signal.

4. Apparatus as claimed in claim 3, wherein said scan chain is driven by a scan chain clock signal that is independent of said processor clock signal.

5. Apparatus as claimed in claim 3, wherein said scan chain is driven by a scan chain clock signal that is independent of said processor clock signal and comprising a synchronization circuit that triggers said program counter latching circuit to latch said instruction address at a predetermined cycle point of said processor clock signal.

6. Apparatus as claimed in claim 1, wherein said program counter latching circuit includes a program counter shadowing register that serves to store said instruction address following said instruction address within said program counter register.

7. Apparatus as claimed in claim 1, wherein said scan chain is part of a JTAG scan chain for performing further diagnostic operations upon said apparatus.

8. Apparatus as claimed in claim 1, wherein said program counter latching circuit is part of a diagnostic circuit within said apparatus that monitors signal values on an address bus and a data bus for coupling said processor unit to a memory.

9. Apparatus as claimed in claim 1, wherein, in response to a sequence of program counter value request signals, said apparatus transfers a sequence of instruction addresses to said diagnostic system representing a spaced sequence of program counter values for instructions executed by said processor unit such that code profiling may be performed by said diagnostic system.

10. Apparatus as claimed in claim 9, wherein said diagnostic system includes a computer operating under software control for performing said code profiling.

11. Apparatus as claimed in claim 1, wherein said apparatus comprises an application specific integrated circuit.

12. A method of processing data, said method comprising the steps of:
    (i) executing data processing instructions upon a processor unit;
    (ii) storing in a program counter register within said processor unit an instruction address of a data processing instruction being executed by said processor unit;
    (iii) in response to a program counter value request signal from a diagnostic system to a program counter latching circuit, latching an instruction address from said program counter register, and transferring said instruction address to a scan chain;
    (iv) serially transferring said instruction address from said scan chain to said diagnostic system; and
    (v) wherein said latching, said transferring and said serial transferring are performed independently of said processor unit such that execution of data processing instructions by said processor unit is unaltered by said latching, said transferring and said serial transferring.

* * * * *